US011792165B2

(12) United States Patent
Akkapeddi et al.

(10) Patent No.: US 11,792,165 B2
(45) Date of Patent: *Oct. 17, 2023

(54) SUPPORTING DATA PROCESSING TRANSACTIONS USING MACHINE TO MACHINE (M2M) DATA TRANSFER

(71) Applicant: Bank of America Corporation, Charlotte, NC (US)

(72) Inventors: Naga Vamsi Krishna Akkapeddi, Charlotte, NC (US); Siten Sanghvi, Westfield, NJ (US); Pratap Dande, Saint Johns, FL (US)

(73) Assignee: Bank of America Corporation, Charlotte, NC (US)

( * ) Notice: Subject to any disclaimer, the term of this patent is extended or adjusted under 35 U.S.C. 154(b) by 246 days.

This patent is subject to a terminal disclaimer.

(21) Appl. No.: 17/339,013

(22) Filed: Jun. 4, 2021

(65) Prior Publication Data

US 2022/0394019 A1 Dec. 8, 2022

(51) Int. Cl.
*H04L 9/40* (2022.01)
*H04L 12/46* (2006.01)
(Continued)

(52) U.S. Cl.
CPC .............. *H04L 63/04* (2013.01); *G06F 21/31* (2013.01); *H04L 12/4641* (2013.01);
(Continued)

(58) Field of Classification Search
CPC ..... H04L 63/04; H04L 12/4641; H04L 63/08; H04L 67/12; G06F 16/9537; G06F 21/31;
(Continued)

(56) References Cited

U.S. PATENT DOCUMENTS

| 4,694,397 A | 9/1987 | Grant et al. |
| 6,378,775 B2 | 4/2002 | Hayashida |

(Continued)

FOREIGN PATENT DOCUMENTS

| CA | 2371734 C | 11/2007 |
| CN | 105580396 B | 4/2019 |

(Continued)

OTHER PUBLICATIONS

U.S. Appl. No. 17/339,967, filed Jun. 4, 2021.*

(Continued)

*Primary Examiner* — Hosuk Song

(57) ABSTRACT

A system is provided for implementing a data processing transaction for a home processor located within a home region. The system is configured to receive a query from a user device of a user, search a list of partner processors located within a foreign region based on the query and transmit to the user device information relating to one or more partner processors determined as a result of the search. The system receives a request to authenticate the data processing transaction at a selected partner processor, verifies an identity of the user based on the request and transmits an indication of successful authentication. The system transmits at least a portion of data relating to a registration of the user at the home processor to the selected partner processor, wherein the data processing transaction is processed by the partner processor based on the transferred data.

20 Claims, 4 Drawing Sheets

(51) Int. Cl.
*G06F 21/31* (2013.01)
*H04L 67/12* (2022.01)
*G06Q 20/40* (2012.01)

(52) U.S. Cl.
CPC .............. *H04L 63/08* (2013.01); *H04L 67/12* (2013.01); *G06F 2221/2111* (2013.01); *G06F 2221/2117* (2013.01); *G06Q 20/409* (2013.01)

(58) Field of Classification Search
CPC ..... G06F 2221/2111; G06F 2221/2117; G06Q 20/10; G06Q 20/409
See application file for complete search history.

(56) References Cited

U.S. PATENT DOCUMENTS

| | | | |
|---|---|---|---|
| 6,554,184 B1 | 4/2003 | Amos | |
| 7,481,359 B2 | 1/2009 | Kawase et al. | |
| 7,783,571 B2 | 8/2010 | Fish et al. | |
| 8,204,829 B2 | 6/2012 | Alvarez et al. | |
| 8,271,382 B2 | 9/2012 | Seifert et al. | |
| 8,355,988 B2 | 1/2013 | Powell | |
| 8,412,627 B2 | 4/2013 | Allen-Rouman et al. | |
| 8,700,412 B2 | 4/2014 | Hansen | |
| 8,781,960 B2 | 7/2014 | Marshall | |
| 8,851,366 B2 | 10/2014 | Modi | |
| 9,477,952 B2 | 10/2016 | Dutta et al. | |
| 9,826,464 B2* | 11/2017 | Visuri | H04M 15/8351 |
| 9,892,406 B2 | 2/2018 | Paschini et al. | |
| 10,311,431 B2 | 6/2019 | Henry | |
| 10,367,811 B2* | 7/2019 | Clark | H04W 4/70 |
| 10,382,926 B2 | 8/2019 | Palanisamy et al. | |
| 10,419,552 B2 | 9/2019 | Li et al. | |
| 10,558,960 B2 | 2/2020 | Tulluri et al. | |
| 10,616,048 B2 | 4/2020 | Bhalla | |
| 10,631,125 B2 | 4/2020 | Baek et al. | |
| 10,764,252 B2 | 9/2020 | Bone et al. | |
| 10,783,502 B2 | 9/2020 | Michelsen et al. | |
| 10,904,946 B2 | 1/2021 | Palanisamy et al. | |
| 10,922,631 B1* | 2/2021 | Shahidzadeh | H04W 4/029 |
| 10,958,552 B2 | 3/2021 | Ly et al. | |
| 2004/0267666 A1 | 12/2004 | Minami et al. | |
| 2014/0214659 A1 | 7/2014 | Hansen | |
| 2015/0180847 A1* | 6/2015 | Nix | H04W 12/03 |
| | | | 713/168 |
| 2016/0183168 A1* | 6/2016 | Horn | H04L 67/51 |
| | | | 709/225 |
| 2017/0323282 A1 | 11/2017 | Doran et al. | |
| 2017/0364881 A1 | 12/2017 | Meszaros et al. | |
| 2018/0041943 A1* | 2/2018 | Visuri | H04M 15/8351 |
| 2020/0092275 A1 | 3/2020 | Seed et al. | |
| 2020/0162427 A1* | 5/2020 | Clark | H04L 63/205 |
| 2020/0294159 A1 | 9/2020 | Throndson et al. | |

FOREIGN PATENT DOCUMENTS

| | | |
|---|---|---|
| CN | 108353262 B | 1/2021 |
| EP | 0200343 B1 | 11/1991 |
| EP | 2945326 B1 | 6/2019 |
| JP | 2020519144 A | 6/2020 |
| KR | 100235531 B1 | 9/1999 |
| KR | 101550062 B1 | 8/2015 |
| KR | 102214073 B1 | 2/2021 |

OTHER PUBLICATIONS

Akkapeddi, N. V, K. et al., "Data Processing Transactions Using Machine to Machine (M2M) Data Transfer," U.S. Appl. No. 17/338,967, filed Jun. 4, 2021 48 pages.

* cited by examiner

SUPPORTING DATA PROCESSING TRANSACTIONS USING MACHINE TO MACHINE (M2M) DATA TRANSFER

TECHNICAL FIELD

The present disclosure relates generally to data processing, and more specifically to supporting data processing transactions using machine to machine (M2M) data transfer.

BACKGROUND

A computing infrastructure including one or more data servers or data processors connected to a network, such as the internet, often allows users that are registered with the computing infrastructure to access data and process data transactions within the computing infrastructure. For example, the user may have an account with a home computing infrastructure located within a home region (e.g., home city, state or country) of the user that allows the user to use data processing services provided by the home computing infrastructure. When the user travels away from the home region of the user to a foreign region (e.g., foreign city, state or country), the user may desire access to the same or similar data processing services provided by the home computing infrastructure based on the user's account with the home computing infrastructure. However, the home computing infrastructure may not have a data server within the foreign region. The user may access the same or similar services provided by the home computing infrastructure using a foreign computing infrastructure which has one or more data servers within the foreign region. However, the foreign computing infrastructure may not be compatible with the home computing infrastructure, and thus, may need to use an intermediary data service to communicate with the home computing infrastructure. As a result, communication between the home infrastructure and the foreign infrastructure is complicated and inefficient. Further, additional costs are associated with using the intermediary data service and the foreign infrastructure which are passed on to the user.

SUMMARY

The system and methods implemented by the system as disclosed in the present disclosure provide technical solutions to the technical problems discussed above by automatically determining partner processors in a foreign region that can provide access to data processing services provided by a home processor and further by coordinating data processing transactions for the user between the home processor and a partner processor. The disclosed system and methods provide several practical applications and technical advantages. For example, the disclosed system provides the practical application of providing access to a user located within a foreign region to data processing transactions of a home processor located in a home region, using a partner processor in a foreign region without using an intermediary service. The partner processor has a pre-determined association with the home processor. For example, the predetermined association comprises a pre-authorized secure connection that can be established between the home processor and the partner processors such that data transfer may occur seamlessly between home processors and partner processors without need of an intermediary service. Thus, the association between the home processor and the partner processor allows the partner processor to provide one or more data processing services otherwise provided by a home processor to users within the foreign region without using an intermediary service and at reasonable costs to the user.

The disclosed system provides an additional practical application of providing a highly efficient method for providing access to a user located within a foreign region to data processing transactions of a home processor located in a home region, using a partner processor in a foreign region, by automatically searching and determining one or more partner processors in the foreign region, authenticating a requested data processing transaction and transferring data required for processing the requested data processing transaction from the home processor to a selected partner processor using machine to machine (M2M) data transfer between a user device of the user, the home processor and the selected partner processor with little to no human intervention. Using M2M data transfer to provide the data processing services to a user significantly improves the overall processing efficiency of the system.

The disclosed system and methods further improve processing performance of the home processor and the partner processor, as well as the network performance of the underlying network connecting the home processor with the partner processor. For example, the home processor selects those partner processors for communicating with the home processor that can establish secure and stable connections with the home processor. The home processor pre-authorizes partner processors that can establish secure and stable connections with the home processor and uses pre-authorized partner processors for communication with the home processor. Using pre-authorized partner processors for communication with the home processor can reduce processing burden on the home processor and partner processors, and further save network bandwidth used for signaling between the processors, which would otherwise be necessary to determine whether secure and stable connection can be established between the home processor and unauthorized servers. The reduced processing burden and saving of network bandwidth improves performance of the home processor and partner processors, and of the underlying network connecting the home processor with the partner processor.

In one or more embodiments, a user device is configured to detect that a user is in a foreign region outside a home region of the user, wherein the user is registered with a home processor located within the home region of the user. The user device provides a recommendation to the user of one or more partner processors located within the foreign region, wherein each of the one or more partner processors has a predetermined association with the home processor. The predetermined association comprises a pre-authorized secure connection that can be established between the home processor and each of the one or more partner processors. The user device receives a selection of a partner processor selected by the user from the one or more partner processors and authenticates a data processing transaction at the selected partner processor by verifying an identity of the user. The user device initiates the data processing transaction at the selected partner processor after the authentication.

In one or more embodiments, a home processor is configured to receive a query from a user device of a user requesting information relating to one or more partner processors located within a foreign region outside a home region of the user, wherein the user is registered with the home processor located within the home region of the user. The home processor searches a list of partner processors for the one or more partner processors located within the foreign region, wherein each of the one or more partner processors has a predetermined association with the home processor and transmits to the user device the information relating to one or more partner processors determined as a result of the search. The predetermined association comprises a preauthorized secure connection that can be established between the home processor and each of the one or more partner processors. The home processor receives a request to authenticate the data processing transaction at a selected partner processor selected from the one or more partner processors, verifies an identity of the user based on the request and transmits an indication of successful authentication of the data processing transaction to one or more of the user device and the selected partner processor. The home processor receives information relating to the data processing transaction and transmits, based on the information relating to the data processing transaction, at least a portion of data relating to the registration of the user at the home processor to the selected partner processor, wherein the data processing transaction is processed by the partner processor based on the transferred data.

Certain aspects of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
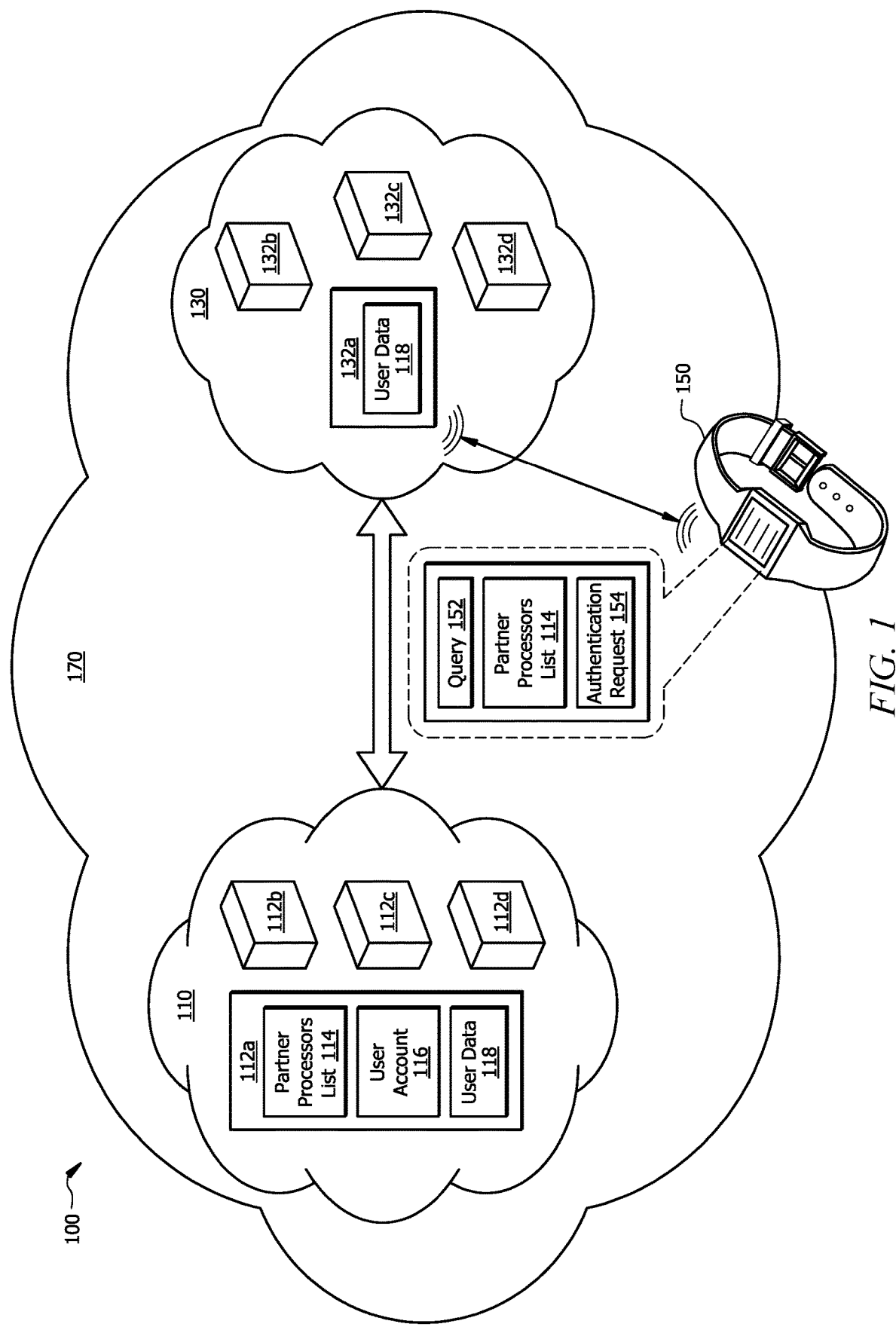
FIG. 1 is a schematic diagram of an example data processing system, in accordance with certain aspects of the present disclosure.

FIG. 1 is a schematic diagram of an example data processing system 100, in accordance with certain aspects of the present disclosure.

As shown in FIG. 1, data processing system 100 may include a home computing infrastructure 110, a partner computing infrastructure 130 and a user device 150, each connected to a network 170. The network 170, in general, may be a wide area network (WAN), a personal area network (PAN), a cellular network, or any other technology that allows devices to communicate electronically with other devices. In one or more embodiments, the network 170 may be the Internet.

The home computing infrastructure 110 may include one or more home processors (shown as 112a-112d). Similarly, partner computing infrastructure 130 may include one or more partner processors (shown as 132a-132d). Each of the home processors 112a-112d of the home computing infrastructure 110 may be configured to provide one or more data processing services to users located within a home region. Users located within the home region may access one or more data processing services provided by the home processors 112a-112d using a user device 150 such as a wearable computing device (e.g., a smart watch), a portable computing device (e.g., smartphone, tablet computer etc.), a laptop computer, a desktop computer or the like. One or more of the home processors 112a-112d may be located within the home region. In some cases, one or more of the home processors 112a-112d may be located outside the home region but may provide one or more data processing services to users located within the home region.

Similarly, each of the partner processors 132a-132d of the partner computing infrastructure 130 may be configured to provide one or more data processing services to users located within a foreign region that is outside of the home region. Users located within the foreign region may access one or more data processing services provided by the partner processors 132a-132d using a user device 150. One or more of the partner processors 132a-132d may be located within the foreign region. In some cases, one or more of the partner processors 132a-132d may be located outside the foreign region but may provide one or more data processing services to users located within the foreign region.

The data processing services provided by the home processors 112a-112d and the partner processors 132a-132d may include, but are not limited to, data cloud storage services, software hosting services, media streaming services and banking services.

In one or more embodiments, each of the home processors 112a-112d, partner processors 132a-132d and user device 150 may be implemented by a computing device running one or more software applications. For example, one or more of the home processors 112a-112d, partner processors 132a-132d and user device 150 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the home processors 112a-112d, partner processors 132a-132d and user device 150 may be representative of a server running one or more software applications to implement respective functionality as described below. In certain embodiments, one or more of the home processors 112a-112d, partner processors 132a-132d and user device 150 may run a thin client software application where the processing is directed by the thin client but largely performed by a central entity such as a server (not shown).

In one or more embodiments, the home region of a user may be representative of a city, state, country, or any other designated region within which a user generally maintains a place of residence and spends most days in a calendar year. On the other hand, the foreign region may be representative of a city, state, country or any other designated region that is outside of the home region of the user. For example, the foreign region may be a city, state or country the user may visit temporarily, for example, for business or pleasure.

Each of the home computing infrastructure 110 and the partner computing infrastructure 130 may be owned and implemented by an enterprise including, but not limited to, a software hosting service provider, a media streaming service provider, a cloud services provider, a retail corporation, and a banking corporation.

A user may be registered with the home computing infrastructure 110 or one or more home processors 112a-112d. For example, the user may have a user account 116 with a home processor that allows the user to use certain data processing services provided by the home processor depending on the nature of the user account 116. In one example use case, home computing infrastructure 110 may be implemented by a software hosting service provider where each home processor (112a-112d) provides access to one or more software to registered users. The level of access of a user may be determined by a subscription level of the user account 116. For example, a higher monthly subscription may provide the user access to a higher number of software, types of software and/or for longer lengths of time at the home processor. In another example use case, home computing infrastructure 110 may be implemented by a cloud data service provider where each home processor (112a-112d) stores user data and provides access to the stored user data. Again, the user may need to have a user account 116 with the cloud data service provider to use the cloud data services.

The user account 116 may be associated with user data 118. User data 118 may include, but is not limited to, personal information related to the user (e.g., user name, social security number), user identification data including ID card number, driving license number, user biometrics data (e.g., fingerprints, face recognition pattern etc.), and information related to the user account 116 including account number and level of access. User data 118 may further include a user credit value associated with the user account 116. The user credit value may represent a credit balance associated with the user account 116. A user may buy user credits and may use the credit balance associated the user account 116 to buy data processing services provided by a home processor (112a-112d).

Similarly, a user may be registered with the partner computing infrastructure 130 or one or more partner processors 132a-132d. For example, the user may have a user account (e.g., similar to user account 116) with a partner processor that allows the registered user to use certain data processing services provided by the partner processor depending on the nature of the user account.

The partner computing infrastructure 130 or one or more partner processors 132a-132d may have a pre-determined association with the home computing infrastructure 110 or one or more home processors 112a-112d. For example, the pre-determined association between a home processor 112a and a partner processor 132a may include a pre-authorized secure connection that can be established or is already established between the home processor 112a and the partner processor 132a. A home processor 112a pre-authorizes those partner processors 132a-132d that can successfully establish a secure connection with the home processor 112a and thereafter communicates with pre-authorized partner processors 132a-132d. In one embodiment, during a pre-authorization phase, a home processor 112a attempts to establish secure connections with each of the partner processors 132a-132d in order to determine whether a secure connection can be established with the partner processors. A secure connection may be established between the home processor 112a and a partner processor 132a by exchanging signaling between them. For example, during an initial attempt to communicate with each other, the home processor 112a and partner processor 132a may exchange security credentials (e.g., security certificates) to verify identities of the processors. The home processor 112a can further check whether data can be reliably exchanged with the partner processor 132a. The home processor 112a pre-authorizes those partner processors 132a-132d that can successfully establish a secure and stable connection with the home processor 112a. The pre-authorized partner processors 132a-132d are then added to the partner processors list 114. The pre-authorization of partner processors 132a-132d allows data exchange to occur seamlessly between the home processor 112a and each of pre-authorized partner processors 132a-132d when a data processing transaction is being processed by the processors. For example, since a secure connection was already established between the home processor 112a and a pre-authorized partner processor 132 during the pre-authorization phase, the processors can skip the initial phase of connection establishment and start exchanging data without delay, thus saving processing resources, network bandwidth and time.

In another example, the pre-determined association may include one or more partner processors 132a-132d pre-authorized for communication with the home computing infrastructure 110 or one or more home processors 112a-112d. A home processor 112a may pre-authorize a partner processor 132a for communication with the home processor 112a, when the partner processor 132 satisfies a minimum threshold security standard. For example, home processor 112a may pre-authorize a partner processor 132a for communication with the home processor 112a, when the partner processor 132a implements one or more security measures approved by the home processor 112a. The approved one or more security measures may include, but are not limited to, anti-virus software, anti-spyware software, firewalls to block unauthorized access to the partner computing infrastructure 130, intrusion prevention systems, virtual private networks to provide safe and secure remote access to the partner computing infrastructure 130 and other measures to restrict physical access to partner processor 132a. By setting a threshold security standard for communicating with a home processors 112a and allowing those partner processors 132a-132d that satisfy the threshold security standard, home processor 112a may save the home computing infrastructure 110 from malicious network attacks and help maintain a high degree of data security.

In another example, a home processor 112a may pre-authorize a partner processor that uses one or more communication protocols approved by the home processor 112a. Using approved communication protocols may allow data transfer to occur seamlessly between home processors 112a-112d and partner processors 132a-132d without need of an intermediary service. In another example, pre-negotiated agreements (e.g., service level agreements) may exist between home processors 112a-112d and partner processors 132a-132d that define protocols and other rules associated with data transfer between home processors 112a-112d and partner processors 132a-132d. An association between a home processor 112a-112d and a partner processor 132a-132d may allow a partner processor 132a-132d to provide one or more data processing services otherwise provided by a home processor 112a-112d to users within the foreign region, for example, without using an intermediary service and at reasonable costs to the user. Thus, one or more of the partner processors 132a-132d may be configured to provide access to one or more services provided by one or more home processors 112a-112d to users located within the foreign region. In one embodiment, the partner processors 132a-132d may be configured to convert data received from the home processors 112a-112d based on local regulations and protocols used by the partner processors 132a-132d.

Thus, a user having a user account 116 with a home processor 112a-112d and physically located within a foreign region outside the home region, may use a partner processor 132a-132d to access one or more services provided by the home processor 112a-112d based on the user account 116. To provide access to the data processing services from the home processor 112a-112d, the partner processor 132a-132d may obtain at least a portion of the user data 118 related to user account 116 of the user (e.g., based on association with the home processor) and provide the data processing services based on the obtained user data 118.

In one example use case, the home computing infrastructure 110 may be implemented by a software hosting service provider (home service provider) that provides access to one or more software to users having user accounts with the home service provider and located within a home region. The partner computing infrastructure 130 may be implemented by another similar software service provider (partner service provider) that provides access to the same or similar one or more software to subscribed users within a foreign region outside the home region. The partner service provider may be partnered with the home service provider by way of a pre-determined association between the service providers as described above. Thus, a user registered with the home service provider but located within the foreign region, may access a software hosted at a home processor of the home service provider using a partner processor of the partner service provider. To provide the user access to a software hosted by a home processor of the home service provider, a partner processor of the partner service provider may exchange data with the home processor based on a pre-determined association with the home processor.

In another example use case, the home computing infrastructure 110 may be implemented by a cloud data service provider (home service provider) that stores data and provides access to the stored data to users having user accounts with the home service provider and located within a home region. The partner computing infrastructure may be implemented by another similar cloud data service provider (partner service provider) that provides access to data hosted by the partner service provider to subscribed users within a foreign region outside the home region. The partner service provider may be partnered with the home service provider by way of a pre-determined association between the service providers as described above. The pre-determined associated may allow a partner processor of the partner service provider to receive data from a home processor of the home service provider. Thus, a user registered with the home service provider but located within the foreign region, may access data hosted by a home processor of the home service provider using a partner processor of the partner service provider. The foreign service provider may convert data received from a home processor to a desired format (e.g., based on local regulations and protocols) before presenting the data to the user on a user device 150.

It may be noted that, while FIG. 1 illustrates a single home computing infrastructure 110 and a single foreign computing infrastructure 130 for ease of illustration and explanation, data processing system 100 may include any number of home and foreign computing infrastructures, wherein each computing infrastructure provides services to users located within different regions or even overlapping regions.

User device 150 may be configured to facilitate and manage data processing transactions with home processors 112a-112d as well as partner processors 132a-132d, as described below. A user device 150 may include any device that includes a communication interface for communicating with home processors 112a-112d and partner processors 132a-132d. A user device 150 may additionally include a user interface including for example, a display and a user input means (e.g., keypad, touch screen etc.), to allow user interaction with the user device 150. For example, the user device 150 may include, but is not limited to, one or more of a wearable computing device (e.g., a smart watch), a portable computing device (e.g., smartphone, tablet computer etc.), a laptop computer, a desktop computer and the like. User device 150 may communicate with each of the home processors 112a-112d as well as partner processors 132a-132d over the network 170 using any known wired or wireless technology. The user device 150 may be registered as an authorized device with the home computing infrastructure 110 or one or more home processors 112a-112d. The registration allows user device 150 to perform certain transactions with the home processors 112a-112d.

User device 150 may be capable of and configured to detect a geo-location of the user device 150, and thus, a geo-location of the user wearing the user device 150, carrying the user device 150 or otherwise in the vicinity of the user device 150. User device 150 may be configured to detect that a user is located in a foreign region that is outside a home region of the user. As described above, the home region of the user may be a designated region within which the home computing infrastructure 110 provides data processing services to users. User device 150 may be configured to determine a geo-location of the user device 150 according to a pre-determined schedule (e.g., periodically). When user device 150 detects that the geo-location of the user device 150 is within a designated foreign region that is outside the home region of the user, the user device 150 determines that the user is located within the foreign region.

As described above, the home computing infrastructure 110 may not provide data processing services outside the home region of the user. User device 150 may be configured to search a partner processors list 114 and determine one or more partner processors (e.g., 132a-132d) in the vicinity of the user device's geo-location within the foreign region. The partner processors list 114 may include information relating to partner processors 132a-132d associated with a plurality of partner processing infrastructures 130 in several foreign regions outside the home region. As described above, each of the partner processors 132a-132d may provide data processing services to users located within the foreign region. In one embodiment, the partner processors list 114 may be stored at one or more of the home processors (e.g., home processor 112a). In this case, in response to detecting that the user device 150 is located within the foreign region, user device 150 automatically transmits (e.g., using machine to machine (M2M) communication) a query 152 to the home processor 112a, wherein the query 152 includes a geo-location of the user device 150 as determined by the user device 150. The home processor 112a receives the query 152 and searches the partner processors list 114 based on the geo-location of the user device 150, for one or more partner processors 132a-132d in the vicinity of the user device 150. The home processor 112a may transmit information relating to the one or more partner processors 132a-132d back to the user device 150. The information relating to the partner processors 132a-132d may include a geo-location and/or local address within the foreign of each of the partner processors 132a-132d.

In an alternative embodiment, a copy of the partner processors list 114 may be stored in a local memory of the user device 150. In this case, user device 150 may be configured to search the partner processors list 114 based on the current geo-location of the user device 150 and determine one or more partner processors 132a-132d in the vicinity of the user device 150 as a result of the search.

Upon obtaining information relating to the one or more partner processors 132a-132d as a result of searching the partner processors list 114 (at the home processor 112a or user device 150), user device 150 may be configured to present a list of the one or more partner processers 132a-132d on a display of the user device 150. The user may select one of the partner processors (e.g., partner processor 132a) from the list using an input interface of the user device 150.

Using user device 150, the user may request a data processing transaction to be processed by the selected partner processor 132a based on the user account 116 with the home processor 112a. For example, when home processor 112a belongs to a cloud data service provider hosting data (e.g., stored as part of user data 118) for the user having the user account 116, the data processing transaction requested by the user may include a request for at least a portion of the user data 118 stored for the user at home processor 112a. To request the data processing transaction, the user may use the user interface of the user device 150 to provide details of the requested data processing transaction including, but not limited to, a type of transaction, requested data and a value related to the transaction. Staying with the cloud data service provider example, the user may specify what part of the user data 118 is requested from the home processor 112a.

In response to receiving information relating to the requested data processing transaction from the user, the user device 150 may be configured to initiate transfer of at least a portion of user data 118 relating to the user account 116 from the home processor 112a to partner processor 132a. For example, user device 150 may send a request to home processor 112a to transmit user data 118 or a portion thereof required for processing the data processing transaction at the partner processor 132a. The request to the home processor 112a for user data 118 may include information relating to requested data processing transaction including, but not limited to, a type of transaction, requested data and a value related to the transaction. In response to receiving the request from the user device 150, home processor 112a may transmit the user data 118 or portion thereof to the partner processor 132a. The partner processor 132a may be configured to process the data processing transaction based on the user data 118 received from the home processor 112a. Continuing with the cloud data service provider example, processing the data processing transaction at the partner processor 132 may include one or more of formatting the received user data 118, converting the user data 118 to a desired format and rendering the data for presenting to the user on a display, for example, of user device 150.

The user device 150 may be configured to authenticate the data processing transaction requested by the user for processing at the partner processor 132a. To authenticate the data processing transaction, the user device 150 may be configured to verify an identify of the user requesting the data processing transaction using the user device 150, so that an authorized user can initiate the transaction. For example, home processor 112a and/or partner processor 132a may allow the owner of the user account 116 alone to initiate the data processing transaction. In this case, user device 150 verifies that the user requesting the transaction using the user device 150 is the owner of the user account 116. To accomplish the verifying, user device 150 may be configured to prompt the user to provide a unique personal identifier of the user. In response, user device 150 may receive the unique personal identifier of the user. The unique personal identifier of the user may include, but is not limited to, a personal identification number (PIN) assigned to the user by the home processor 112a, a government ID card number, driving license number, user biometrics data (e.g., fingerprints, face recognition pattern, etc.), voice pattern and combinations thereof. The unique personal identifier of the user may be stored locally at the user device 150. In this case, the user device 150 may compare the received personal identifier to the stored personal identifier of the user. User device 150 may determine that the transaction is successfully authenticated in response to a successful match between the received and stored personal identifiers. In an alternative embodiment, home processor 112a may store one or more pre-verified unique personal identifiers for the user as part of the user data 118. In this case, user device 150 may transmit an authentication request 154 to home processor 112a to authenticate the requested transaction, wherein the authentication request 154 includes the personal identifier obtained by the user device 150 from the user requesting the transaction. Upon receiving the authentication request 154, home processor 112a compares the personal identifier received in the authentication request 154 to a respective personal identifier of the user stored at the home processor 112a. If the personal identifiers match, home processor 112a determines that the transaction is authenticated and transmits an indication of successful authentication to the user device 150 and/or partner processor 132a.

In some cases, user device 150 may be configured to request pre-authorization of the data processing transaction from the home processor 112a to save the partner processor 132a from requesting necessary authorizations while processing the data processing transaction, which may introduce additional delays and inefficiencies in the processing. Once the user selects the partner processor 132a and provides information relating to the requested data processing transaction, user device 150 may transmit a request for pre-authorizing the data processing transaction to the home processor 112a. The request for pre-authorizing may include, but is not limited to, information related to a type of the transaction and a value related to the transaction. In one embodiment, to determine whether the data processing transaction can be authorized, home processor 112a checks whether a user credit associated with the user account 116 is same as or higher than the value related to the transaction (as received in the request for pre-authorizing). Home processor 112a may be configured to authorize the data processing transaction when the user credit associated with the user account 116 is same as or higher than the value related to the transaction. Home processor 112a is configured to transmit an indication to the partner processor 132a and/or user device 150 indicating that the data processing transaction has been authorized.

For example, in a banking use case, home computing infrastructure 110 may be representative of a computing infrastructure belonging to a home bank that provides banking related services to users within a home country. The user may have a bank account at the home bank, wherein the bank account holds a certain amount of funds. User account 116 may be representative of the user's bank account and user data 118 may include information relating to the amount of funds held in the user's bank account. When the user travels outside the home country to a foreign country, the user may need to access to funds from his/her bank account at the home bank to cover expenses within the foreign country. However, the home bank may not have a retail presence within the foreign country. However, the home bank may have a partner bank in the foreign country using which the user may access funds in the home bank account. The partner computing infrastructure 130 may be representative of a computing infrastructure belonging to the partner bank. The user device 150 of the user may detect that the user is in the foreign country and provide recommendations to the user of one or more partner processors 132a-132d belonging to the partner bank. Each partner processor 132a-132d may be representative of a retail baking location of the partner bank. The user may select one of the partner processors (e.g., partner processor 132a) and may further specify details of a data processing transaction to be processed by the selected partner bank. In this case, the data processing transaction may include a funds withdrawal transaction. User device 150 may authenticate the requested transaction by verifying the identity of the user and additionally request pre-authorization of the transaction, wherein the request may include a value of the funds withdrawal. Home processor 112a may authorize the transaction if the user's bank account has sufficient funds to cover the funds withdrawal at the partner bank. Further, to support the funds withdrawal transaction at the partner processor 132a, home processor 112a may further transfer data related to the user's bank account to the partner processor 132a. The data transferred to the partner processor may include information relating to the amount of funds held in the user's bank account and/or transfer of required funds from the user's bank account to the partner bank. Once the funds withdrawal transaction has been authenticated, pre-authorized and required data has been transferred to the partner processor 132a, the user device 150 may initiate the funds withdrawal at the partner bank location. Pre-authorization, pre-authentication and pre-transfer of data required to process the transaction before the user device 150 actually initiates the withdrawal transaction at the partner bank location allows the transaction to be processed at the partner bank quickly and without any delays that can be associated with authorizing the transaction, authenticating the user's identity and requesting data from the home processor 112a.

Figure 2:
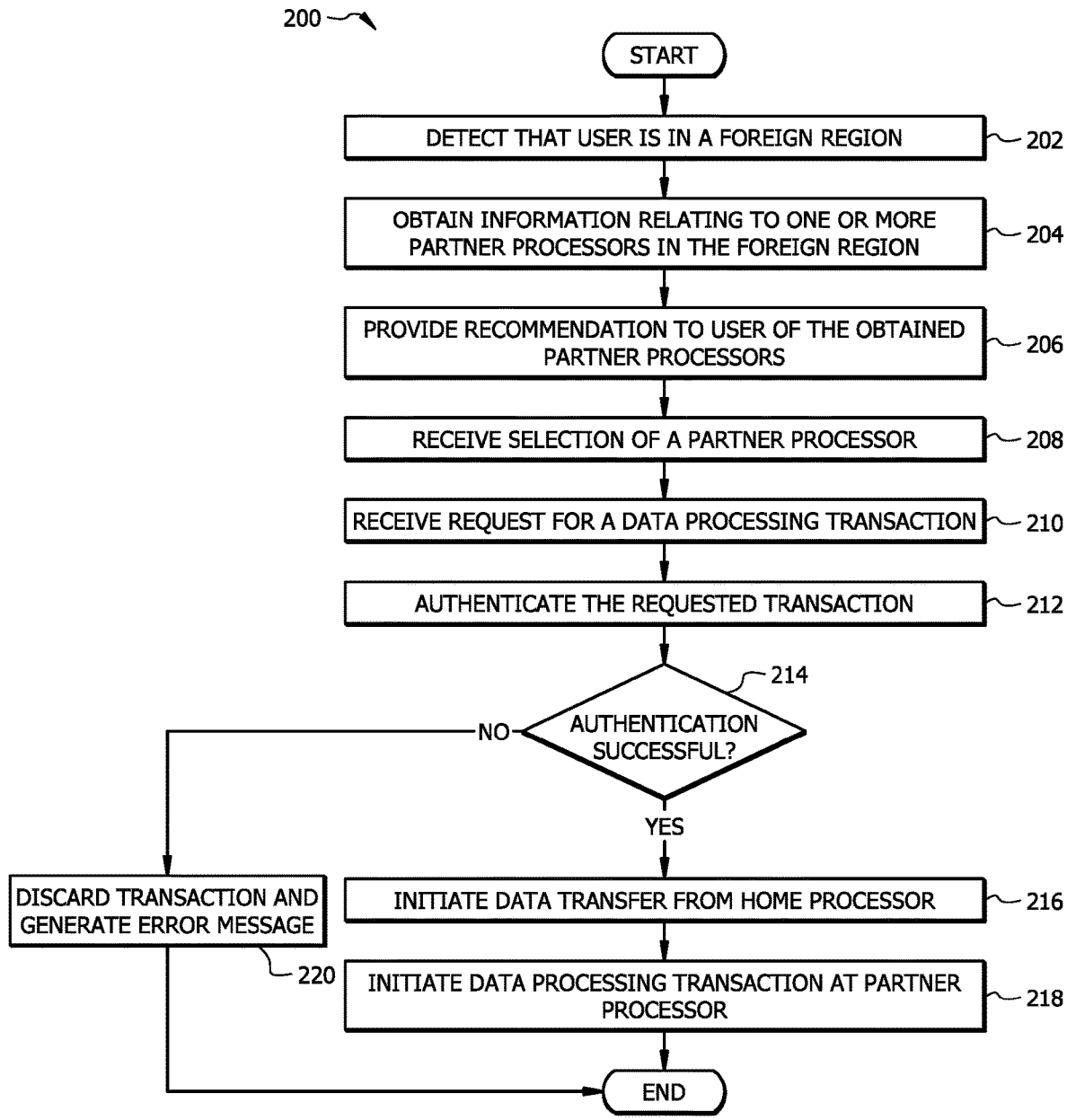
FIG. 2 is a flowchart of an example method for managing a data processing transaction using a user device, in accordance with certain embodiments of the present disclosure.

FIG. 2 is a flowchart of an example method 200 for managing a data processing transaction, in accordance with certain embodiments of the present disclosure. Method 200 may be performed by the user device 150 as shown in FIG. 1 and described above.

At step 202, user device 150 detects that the user is in a foreign region outside a home region of the user. The user may be registered with a home computing infrastructure 110 or one or more home processors 112a-112d of the home computing infrastructure 110. For example, the user may have a user account 116 with the home processor 112a that allows the user to use certain data processing services provided by the home processor 112a depending on the nature of the user account 116.

In one or more embodiments, the home region of the user may be representative of a city, state, country, or any other designated region within which the user generally maintains a place of residence and spends most days in a calendar year. On the other hand, the foreign region may be representative of a city, state, country or any other designated region that is outside the home region of the user.

Home processors 112a of the home computing infrastructure 110 may be configured to provide one or more data processing services to the user within the home region. The users may access the one or more data processing services provided by the home processor 112a using the user device 150. The user device 150 may be registered as an authorized device with the home computing infrastructure 110 or the home processor 112a of the home computing infrastructure 110. The registration allows user device 150 to perform certain transactions with the home processor 112a. User device 150 may be configured to facilitate and manage data processing transactions with the home processor 112a, as described below. The user device 150 may include any device that includes a communication interface for communicating with the home processor 112a. A user device 150 may additionally include a user interface including for example, a display and a user input means (e.g., keypad, touch screen etc.), to allow user interaction with the user device 150. For example, the user device 150 may include, but is not limited to, one or more of a wearable computing device (e.g., a smart watch), a portable computing device (e.g., smartphone, tablet computer etc.), a laptop computer, a desktop computer and the like.

The user account 116 may be associated with user data 118. User data 118 may include, but is not limited to, personal information related to the user (e.g., user name, social security number), user identification data including ID card number, driving license number, user biometrics data (e.g., fingerprints, face recognition pattern etc.), and information related to the user account 116 including account number and level of access. User data 118 may further include a user credit value associated with the user account 116. The user credit value may represent a credit balance associated with the user account 116. The user may buy user credits and may use the credit balance associated the user account 116 to buy data processing services provided by a home processor (112a-112d).

User device 150 may be capable of and configured to detect a geo-location of the user device 150, and thus, a geo-location of the user wearing the user device 150, carrying the user device 150 or otherwise in the vicinity of the user device 150. User device 150 may determine a geo-location of the user device 150 according to a pre-determined schedule (e.g., periodically). When user device 150 detects that the geo-location of the user device 150 is within a designated foreign region that is outside the home region of the user, the user device 150 determines that the user is located within the foreign region.

At step 204, user device 150 obtains information related to one or more partner processors (e.g., partner processors 132a-132d) in the vicinity of the user device 150 within the foreign region. Each of the partner processors 132a-132d may belong to a partner computing infrastructure 130 as shown in FIG. 1. Like the home processor 112a, the each of the partner processors 132a-132d may be configured to provide one or more data processing services to users within the foreign region. The user may access the one or more data processing services provided by the partner processors 132a-132d using the user device 150.

Each of the partner processor 132a-132d may have a pre-determined association with the home processor 112a. For example, the pre-determined association between a home processor 112a and a partner processor 132a may include a pre-authorized secure connection that can be established or is already established between the home processor 112a and the partner processor 132a. In another example, the pre-determined association may include one or more partner processors 132a-132d pre-authorized for communication with the home computing infrastructure 110 or one or more home processors 112a-112d. A home processor 112a may pre-authorize a partner processor 132a for communication with the home processor 112a, when the partner processor 132 satisfies a minimum threshold security standard. In another example, a home processor 112a may pre-authorize a partner processor that uses one or more communication protocols approved by the home processor 112a. Using approved communication protocols may allow data transfer to occur seamlessly between the home processor 112a and a partner processor (e.g., 132a) without need of an intermediary service. In another example, pre-negotiated agreements (e.g., service level agreements) may exist between home processor 112a and each of the partner processors 132a-132d that define protocols and other rules associated with data transfer between the home processor 112a and the partner processors 132a-132d. An association between the home processor 112a and a partner processor 132a may allow the partner processor 132a to provide one or more data processing services otherwise provided by the home processor 112a to the user within the foreign region, for example, without using an intermediary service and at reasonable costs to the user. Thus, the partner processor 132a may be configured to provide access to one or more services provided by the home processor 112a to the user located within the foreign region. In one embodiment, a partner processor 132a may be configured to convert data received from the home processor 112a based on local regulations and protocols used by the partner processor 132a.

Thus, a user having the user account 116 with the home processor 112a and physically located within the foreign region outside the home region, may use one of the partner processor 132a-132d to access one or more services provided by the home processor 112a based on the user account 116. To provide access to the data processing services from the home processor 112a, a partner processor 132a may obtain at least a portion of the user data 118 related to user account 116 of the user (e.g., based on association with the home processor 112a) and provide the data processing services based on the obtained user data 118.

User device 150 may be configured to search a partner processors list 114 and determine the one or more partner processors 132a-132d in the vicinity of the user device's geo-location within the foreign region. The partner processors list 114 may include information relating to partner processors 132a-132d associated with a plurality of partner processing infrastructures 130 in several foreign regions outside the home region. As described above, each of the partner processors 132a-132d may provide data processing services to users located within the foreign region. In one embodiment, the partner processors list 114 may be stored at the home processor 112a. In this case, in response to detecting that the user device 150 is located within the foreign region, user device 150 automatically transmits (e.g., using machine to machine (M2M) communication) a query 152 to the home processor 112a, wherein the query 152 includes a geo-location of the user device 150 as determined by the user device 150. The home processor 112a receives the query 152 and searches the partner processors list 114 based on the geo-location of the user device 150, for one or more partner processors 132a-132d in the vicinity of the user device 150. The home processor 112a may transmit information relating to the one or more partner processors 132a-132d back to the user device 150. The information relating to the one or more partner processors 132a-132d may include a geo-location and/or local address within the foreign of the each of the partner processors 132a-132d.

In an alternative embodiment, a copy of the partner processors list 114 may be stored in a local memory of the user device 150. In this case, user device 150 may be configured to search the partner processors list 114 based on the current geo-location of the user device 150 and determine the one or more partner processors 132a-132d in the vicinity of the user device 150 as a result of the search.

At step 206, upon obtaining information relating to the one or more partner processors 132a-132d as a result of searching the partner processors list 114 (at the home processor 112a or user device 150), user device 150 may present a list of the one or more partner processers 132a-132d as recommended partner processors on a display of the user device 150. The user may select one of the partner processors (e.g., partner processor 132a) from the list using an input interface of the user device 150.

At step 208, user device 150 receives a selection of a partner processor 132a selected by the user from the list of partner processors 132a-132d recommended to the user.

At step 210, user device 150 receives a request for a data processing transaction based on the user account 116 at the home processor 112a. Using user device 150, the user may request the data processing transaction to be processed by the selected partner processor 132a based on the user account 116 the user has with the home processor 112a. For example, when home processor 112a belongs to a cloud data service provider hosting data (e.g., stored as part of user data 118) for the user having the user account 116, the data processing transaction requested by the user may include a request for at least a portion of the user data 118 stored for the user at home processor 112a. To request the data processing transaction, the user may use the user interface of the user device 150 to provide details of the requested data processing transaction including, but not limited to, a type of transaction, requested data and a value related to the transaction.

At step 212, user device 150 authenticates the data processing transaction requested by the user. The user device 150 may be configured to authenticate the data processing transaction requested by the user for processing at the partner processor 132a. To authenticate the data processing transaction, the user device 150 may verify an identify of the user requesting the data processing transaction using the user device 150, so that an authorized user can initiate the transaction. For example, home processor 112a and/or partner processor 132a may allow the owner of the user account 116 alone to initiate the data processing transaction. In this case, user device 150 verifies that the user requesting the transaction using the user device 150 is the owner of the user account 116 at the home processor 112a. To accomplish the verifying, user device 150 may be configured to prompt the user to provide a unique personal identifier of the user. In response, user device 150 may receive the unique personal identifier of the user provided by the user using a user interface of the user device 150. The unique personal identifier of the user may include, but is not limited to, a personal identification number (PIN) assigned to the user by the home processor 112a, a government ID card number, driving license number, user biometrics data (e.g., fingerprints, face recognition pattern, etc.), user voice pattern and combinations thereof. User device 105 may have one or more pre-verified personal identifiers of the user stored locally at the user device 150. In this case, the user device 150 may compare the received personal identifier to the stored pre-verified personal identifier of the user. User device 150 may determine that the transaction is successfully authenticated in response to a successful match between the received and stored personal identifiers. In an alternative embodiment, home processor 112a may store one or more pre-verified unique personal identifiers for the user as part of the user data 118. In this case, user device 150 may transmit (e.g., using M2M data transfer) an authentication request 154 to home processor 112a to authenticate the requested transaction, wherein the authentication request 154 includes the personal identifier obtained by the user device 150 from the user requesting the transaction. Upon receiving the authentication request 154, home processor 112a compares the personal identifier received in the authentication request 154 to a respective pre-verified personal identifier of the user stored at the home processor 112a. If the personal identifiers match, home processor 112a determines that the transaction is authenticated and transmits an indication of successful authentication to the user device 150 and/or partner processor 132a.

At step 214, user device 150 determines whether the data processing transaction requested by the user was successfully authenticated. For example, when the user device 150 verifies identity of the user locally, user device 150 determines successful authentication based on whether the user requesting the data processing transaction is the owner of user account 116 at home processor 112a. User device 150 determines that the data processing transaction is successfully authenticated when user device 150 successfully verifies the identity of the user as being the owner of user account 116. In an alternative embodiment, when the user device transmits the authentication request 154 to the home processor 112a, user device 150 determines that the data processing transaction is successfully authenticated when user device 150 receives an indication from the home processor 112a that the identity of the user was successfully verified as the owner of user account 116. When user device 150 is unable to successfully authenticate the data processing transaction, method 200 proceeds to step 220 where user device 150 discards the requested data processing transaction and generates an error message. The error message may be communicated to the user using the user interface of the user device 150. For example, the error message may be displayed over a display of the user device 150.

When user device 150 successfully authenticates the data processing transaction, method 200 proceeds to step 216. At step 216, user device 150 initiates a transfer of data required to process the data processing transaction from the home processor 112a to partner processor 132a.

In response to successfully authenticating the requested data processing transaction from the user, the user device 150 may be configured to initiate transfer of at least a portion of user data 118 relating to the user account 116 from the home processor 112a to partner processor 132a. For example, user device 150 may send a request to home processor 112a to transmit user data 118 or a portion thereof required for processing the data processing transaction at the partner processor 132a. The request to the home processor 112a for user data 118 may include information relating to requested data processing transaction including, but not limited to, a type of transaction, requested data and a value related to the transaction. In response to receiving the request from the user device 150, home processor 112a may transmit the user data 118 or a portion thereof to the partner processor 132a. The partner processor 132a may be configured to process the data processing transaction based on the user data 118 received from the home processor 112a.

At step 218, user device 150 may initiate the requested data processing transaction at the partner processor 132a. For example, in response successfully authenticating the data processing transaction and optionally receiving an indication from the home processor 112a that user data 118 or a portion thereof has been successfully transferred to partner processor 132a, user device trigger processing of the data processing transaction at the partner processor, for example, using M2M data exchange with the partner processor 132a.

In an optional embodiment, user device 150 may receive results of processing the data processing transaction and may communicate the results to the user via the user interface of the user device 150.

In some cases, user device 150 may be configured to request pre-authorization of the data processing transaction from the home processor 112a to save the partner processor 132a from requesting necessary authorizations while processing the data processing transaction, which may introduce additional delays and inefficiencies in processing the transaction at the partner processor 132a. Once the user selects the partner processor 132a provides information relating to the requested data processing transaction, and the requested transaction is authenticated, user device 150 may transmit a request for pre-authorizing the data processing transaction to the home processor 112a. The request for pre-authorizing may include, but is not limited to, information related to a type of the transaction and a value related to the transaction. In one embodiment, to determine whether the data processing transaction can be authorized, home processor 112a checks whether a user credit associated with the user account 116 is same as or higher than the value related to the transaction (as received in the request for pre-authorizing). Home processor 112a may be configured to authorize the data processing transaction when the user credit associated with the user account 116 is same as or higher than the value related to the transaction. Home processor 112a is configured to transmit an indication to the partner processor 132a and/or user device 150 indicating that the data processing transaction has been authorized.

Figure 3:
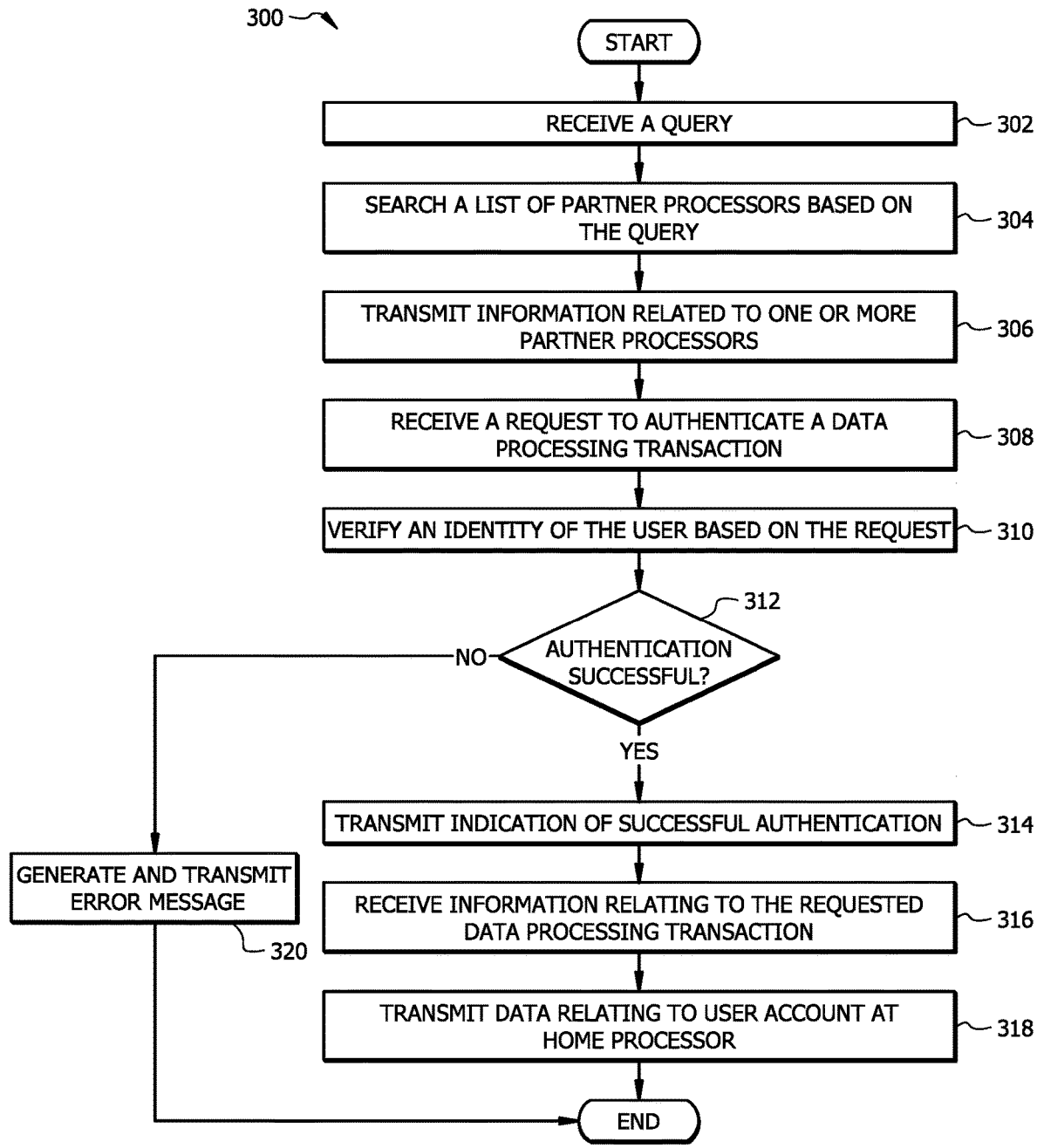
FIG. 3 is a flowchart of an example method for supporting a data processing transaction at a partner processor, in accordance with certain embodiments of the present disclosure.

FIG. 3 is a flowchart of an example method 300 for supporting a data processing transaction at a partner processor, in accordance with certain embodiments of the present disclosure. Method 300 may be performed by any one of the home processors 112a-112d as shown in FIG. 1 and described above.

At step 302, a home processor 112a receives a query 152 from a user device 150 of a user requesting information relating to one or more partner processors 132a-132d located within a foreign region outside of a home region of the user. Home processor 112a may be part of a home computing infrastructure 110 including a plurality of home processors 112a-112d. The user may be registered with the home computing infrastructure 110 or one or more home processors 112a-112d of the home computing infrastructure 110. For example, the user may have a user account 116 with the home processor 112a that allows the user to use certain data processing services provided by the home processor 112a depending on the nature of the user account 116.

In one or more embodiments, the home region of the user may be representative of a city, state, country, or any other designated region within which the user generally maintains a place of residence and spends most days in a calendar year. On the other hand, the foreign region may be representative of a city, state, country or any other designated region that is outside of the home region of the user.

Home processor 112a of the home computing infrastructure 110 may be configured to provide one or more data processing services to the user within the home region. The users may access the one or more data processing services provided by the home processor 112a using the user device 150. The user device 150 may be registered as an authorized device with the home computing infrastructure 110 or the home processor 112a of the home computing infrastructure 110. The registration allows user device 150 to perform certain transactions with the home processor 112a. User device 150 may be configured to facilitate and manage data processing transactions with the home processor 112a, as described below. The user device 150 may include any device that includes a communication interface for communicating with the home processor 112a or one or more partner processors 132a-132d. A user device 150 may additionally include a user interface including for example, a display and a user input means (e.g., keypad, touch screen etc.), to allow user interaction with the user device 150. For example, the user device 150 may include, but is not limited to, one or more of a wearable computing device (e.g., a smart watch), a portable computing device (e.g., smartphone, tablet computer etc.), a laptop computer, a desktop computer and the like.

Each of the partner processors 132a-132d may belong to a partner computing infrastructure 130 as shown in FIG. 1. Like the home processor 112a, each of the partner processors 132a-132d may be configured to provide one or more data processing services to users within the foreign region. The user may access the one or more data processing services provided by the partner processors 132a-132d using the user device 150.

Each of the partner processor 132a-132d may have a pre-determined association with the home processor 112a. For example, the pre-determined association between a home processor 112a and a partner processor 132a may include a pre-authorized secure connection that can be established or is already established between the home processor 112a and the partner processor 132a. In another example, the pre-determined association may include one or more partner processors 132a-132d pre-authorized for communication with the home computing infrastructure 110 or one or more home processors 112a-112d. A home processor 112a may pre-authorize a partner processor 132a for communication with the home processor 112a, when the partner processor 132 satisfies a minimum threshold security standard. In another example, a home processor 112a may pre-authorize a partner processor that uses one or more communication protocols approved by the home processor 112a. Using approved communication protocols may allow data transfer to occur seamlessly between the home processor 112a and a partner processor (e.g., 132a) without need of an intermediary service. In another example, pre-negotiated agreements (e.g., service level agreements) may exist between home processor 112a and each of the partner processors 132a-132d that define protocols and other rules associated with data transfer between the home processor 112a and the partner processors 132a-132d. An association between the home processor 112a and a partner processor 132a may allow the partner processor 132a to provide one or more data processing services otherwise provided by the home processor 112a to the user within the foreign region, for example, without using an intermediary service and at reasonable costs to the user. Thus, for example each partner processor 132a-132d may be configured to provide access to one or more services provided by the home processor 112a to the user located within the foreign region. In one embodiment, a partner processor 132a may be configured to convert data received from the home processor 112a based on local regulations and protocols used by the partner processor 132a.

Thus, a user having the user account 116 with the home processor 112a and physically located within the foreign region outside the home region, may use one of the partner processor 132a-132d to access one or more services provided by the home processor 112a based on the user account 116. To provide access to the data processing services from the home processor 112a, a partner processor 132a may obtain at least a portion of the user data 118 related to user account 116 of the user (e.g., based on association with the home processor 112a) and provide the data processing services based on the obtained user data 118.

The user account 116 may be associated with user data 118. User data 118 may include, but is not limited to, personal information related to the user (e.g., user name, social security number), user identification data including ID card number, driving license number, user biometrics data (e.g., fingerprints, face recognition pattern etc.), and information related to the user account 116 including account number and level of access. User data 118 may further include a user credit value associated with the user account 116. The user credit value may represent a credit balance associated with the user account 116. The user may buy user credits and may use the credit balance associated the user account 116 to buy data processing services provided by the home processor 112a.

User device 150 may be capable of and configured to detect a geo-location of the user device 150, and thus, a geo-location of the user wearing the user device 150, carrying the user device 150 or otherwise in the vicinity of the user device 150. User device 150 may determine a geo-location of the user device 150 according to a pre-determined schedule (e.g., periodically). When user device 150 detects that the geo-location of the user device 150 is within a designated foreign region that is outside the home region of the user, the user device 150 determines that the user is located within the foreign region.

User device 150 may be configured to search a partner processors list 114 and determine the one or more partner processors 132a-132d in the vicinity of the user device's geo-location within the foreign region. The partner processors list 114 may include information relating to partner processors 132a-132d associated with a plurality of partner processing infrastructures 130 in several foreign regions outside the home region. As described above, each of the partner processors 132a-132d may provide data processing services to users located within the foreign region. In one embodiment, the partner processors list 114 may be stored at the home processor 112a. In this case, in response to detecting that the user device 150 is located within the foreign region, user device 150 automatically transmits (e.g., using machine to machine (M2M) communication) the query 152 to the home processor 112a, wherein the query 152 includes a geo-location of the user device 150 as determined by the user device 150.

At step 304, home processor 112a receives the query 152 and searches the partner processors list 114 based on the geo-location of the user device 150 included the query, for one or more partner processors 132a-132d in the vicinity of the user device 150. At step 306, home processor 112a transmits back to the user device 150 information relating to the one or more partner processors 132a-132d determined as a result of searching the partner processors list 114. The information relating to the one or more partner processors 132a-132d may include a geo-location and/or local address within the foreign of the each of the partner processors 132a-132d. Upon receiving the information relating to the one or more partner processors 132a-132d as a result of searching the partner processors list 114 at the home processor 112a, user device 150 may present a list of the one or more partner processers 132a-132d as recommended partner processors on a display of the user device 150. The user may select one of the partner processors (e.g., partner processor 132a) from the list using an input interface of the user device 150.

As described above, using user device 150, the user may request a data processing transaction to be processed by the selected partner processor 132a based on the user account 116 the user has with the home processor 112a. For example, when home processor 112a belongs to a cloud data service provider hosting data (e.g., stored as part of user data 118) for the user having the user account 116, the data processing transaction requested by the user may include a request for at least a portion of the user data 118 stored for the user at home processor 112a. To request the data processing transaction, the user may use the user interface of the user device 150 to provide details of the requested data processing transaction including, but not limited to, a type of transaction, requested data and a value related to the transaction.

At step 308, home processor 112a receives a request to authenticate a data processing transaction at a selected partner processor 132a selected from the one or more partner processors 132a-132d. As described above, user device 150 may be configured to authenticate the data processing transaction requested by the user for processing at the partner processor 132a. To authenticate the data processing transaction, an identity of the user requesting the data processing transaction may need to be verified, so that an authorized user can initiate the transaction. For example, home processor 112a and/or partner processor 132a may allow the owner of the user account 116 alone to initiate the data processing transaction. In this case, user device 150 may need to verify that the user requesting the transaction using the user device 150 is the owner of the user account 116 at the home processor 112a. To accomplish the verifying, user device 150 may be configured to prompt the user to provide a unique personal identifier of the user. In response, user device 150 may receive the unique personal identifier of the user provided by the user using a user interface of the user device 150. The unique personal identifier of the user may include, but is not limited to, a personal identification number (PIN) assigned to the user by the home processor 112a, a government ID card number, driving license number, user biometrics data (e.g., fingerprints, face recognition pattern, etc.), user voice pattern and combinations thereof. Home processor 112a may store one or more pre-verified unique personal identifiers for the user as part of the user data 118. In this case, user device 150 may transmit (e.g., using M2M data transfer) an authentication request 154 to home processor 112a to authenticate the requested transaction, wherein the authentication request 154 includes the personal identifier obtained by the user device 150 from the user requesting the transaction.

At step 310, home processor 112a verifies an identity of the user requesting the data processing transaction using the user device 150. For example, upon receiving the authentication request 154 from the user device 150, home processor 112a compares the personal identifier received in the authentication request 154 to a respective pre-verified personal identifier of the user stored at the home processor 112a. Home processor 112a may determine that the data processing transaction is successfully authenticated, if the personal identifier received in the authentication request 154 matches with the respective pre-verified personal identifier. When the personal identifiers do not match, home processor 112a determines that the data processing transaction is not authenticated.

At step 312, home processor checks whether the data processing transaction requested by the user was successfully authenticated. If home processor 112a determines that the data processing transaction was not successfully authenticated, method 300 proceeds to step 320 where home processor generates and transmits an error message to the user device 150.

On the other hand, when home processor 112a determines that the data processing transaction was successfully authenticated, method 300 proceeds to step 314, where home processor 112a transmits an indication of successful authentication to the user device 150 and/or partner processor 132a.

At step 316, home processor receives information relating to the data processing transaction. In response to receiving an indication that the data processing transaction has been successfully authenticated, the user device 150 may be configured to initiate transfer of at least a portion of user data 118 relating to the user account 116 from the home processor 112a to partner processor 132a. For example, user device 150 may send a request to home processor 112a to transmit user data 118 or a portion thereof required for processing the data processing transaction at the partner processor 132a. The request to the home processor 112a for user data 118 may include information relating to requested data processing transaction including, but not limited to, a type of transaction, requested data and a value related to the transaction.

At step 318, in response to receiving the request from the user device 150, home processor 112a may transmit the user data 118 or a portion thereof to the partner processor 132a. The partner processor 132a may be configured to process the data processing transaction based on the user data 118 received from the home processor 112a.

Figure 4:
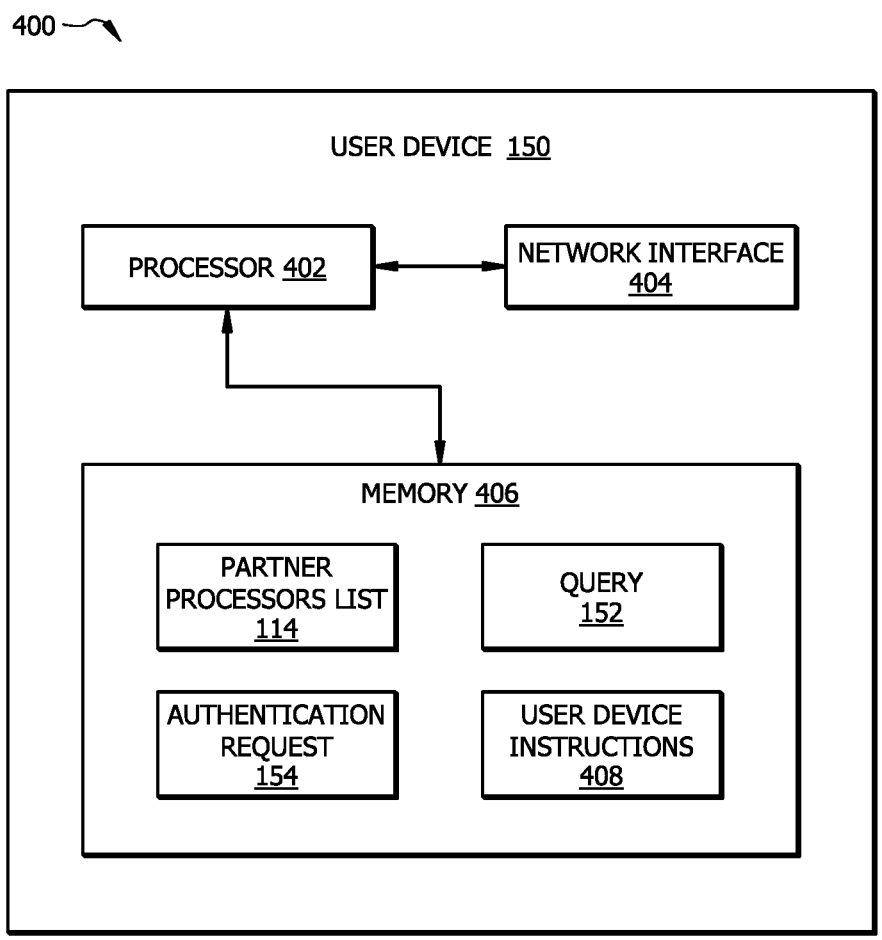
FIG. 4 illustrates an example schematic diagram of the user device illustrated in FIG. 1, in accordance with one or more embodiments of the present disclosure.

FIG. 4 illustrates an example schematic diagram of the user device 150 illustrated in FIG. 1, in accordance with one or more embodiments of the present disclosure.

User device 150 includes a processor 402, a memory 406, and a network interface 404. The User device 150 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., user device instructions 408) to implement the User device 150. In this way, processor 402 may be a special-purpose computer designed to implement the functions disclosed herein. In one or more embodiments, the User device 150 is implemented using logic units, FPGAs, ASICs, DSPs, or any other suitable hardware. The User device 150 is configured to operate as described with reference to FIGS. 1-2. For example, the encoder may be configured to perform at least a portion of the method 200 as described in FIG. 2.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store query 152, partner processors list 114, authentication request 154 and user device instructions 408. The user device instructions 408 may include any suitable set of instructions, logic, rules, or code operable to execute the User device 150.

The network interface 404 is configured to enable wired and/or wireless communications. The network interface 404 is configured to communicate data between the User device 150 and other devices, systems, or domains (e.g. one or more home processors 112a-112d, one or more partner processors 132a-132d etc.). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

It may be noted that each of the home processors 112a-112d and partner processors 132a-132d may be implemented similar to the user device 150. For example, the each of the home processors 112a-112d and partner processors 132a-132d may include a processor and a memory storing instructions to implement the respective functionality of the home processor and partner processor when executed by the processor. The memory of each home processor 112a-112d may store the partner processors list 114, user account 116 and user data 118. The memory of each partner processor 132a-132d may also store a copy of the user data 118.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for implementing a data processing transaction for a home processor, comprising:
at least one processor configured to:
receive a query from a user device of a user requesting information relating to one or more partner processors located within a foreign region outside a home region of the user, wherein the user is registered with the home processor located within the home region of the user;
search a list of partner processors for the one or more partner processors located within the foreign region, wherein each of the one or more partner processors has a predetermined association with the home processor, wherein the predetermined association comprises a pre-authorized secure connection that can be established between the home processor and each of the one or more partner processors;
transmit to the user device the information relating to one or more partner processors determined as a result of the search;
receive a request to authenticate the data processing transaction at a selected partner processor selected from the one or more partner processors;
verify an identity of the user based on the request;
transmit to one or more of the user device and the selected partner processor an indication of successful authentication of the data processing transaction;
receive information relating to the data processing transaction; and
transmit, based on the information relating to the data processing transaction, at least a portion of data relating to the registration of the user at the home processor to the selected partner processor, wherein the data processing transaction is processed by the selected partner processor based on the transmitted data; and
a memory coupled to the at least one processor and configured to store the list of partner processors and the data relating to the registration of the user.

2. The system of claim 1, wherein the information relating to the data processing transaction comprises one or more of a type of the data processing transaction and a value related to the data processing transaction.

3. The system of claim 2, wherein the data relating to the registration of the user comprises one or more of an identity of the user, an identity of the home processor, an identity of the user device and at least a portion of a user credit associated with the registration of the user at the home processor.

4. The system of claim 1, wherein the query received from the user device comprises a geo-location of the user device located within the foreign region.

5. The system of claim 1, wherein the at least one processor is further configured to:
- receive a request from the user device for pre-authorizing the data processing transaction at the selected partner processor, wherein the request for pre-authorizing comprises information relating to one or more of a type of the data processing transaction and a value related to the data processing transaction;
- determine whether the registration of the user at the home processor is associated with a user credit that is higher than the value related to the data processing transaction; and
- when the user credit is higher than the value related to the data processing transaction, transmit an indication to one or more of the user device and the selected partner processor that the pre-authorization is approved.

6. The system of claim 1, wherein:
- the request to authenticate comprises a unique personal identifier of the user; and
- the at least one processor is configured to verify the identity of the user based on the unique personal identifier of the user.

7. The system of claim 6, wherein the unique personal identifier comprises biometric data related to the user, a voice pattern related to the user, an identifier of the user device and a personal identifier number (PIN) assigned to the user.

8. A method for operating a home processor comprising:
- receiving a query from a user device of a user requesting information relating to one or more partner processors located within a foreign region outside a home region of the user, wherein the user is registered with the home processor located within the home region of the user;
- searching a list of partner processors for the one or more partner processors located within the foreign region, wherein each of the one or more partner processors has a predetermined association with the home processor, wherein the predetermined association comprises a pre-authorized secure connection that can be established between the home processor and each of the one or more partner processors;
- transmitting to the user device the information relating to one or more partner processors determined as a result of the search;
- receiving a request to authenticate a data processing transaction at a selected partner processor selected from the one or more partner processors;
- verifying an identity of the user based on the request;
- transmitting to one or more of the user device and the selected partner processor an indication of successful authentication of the data processing transaction;
- receiving information relating to the data processing transaction; and
- transmitting, based on the information relating to the data processing transaction, at least a portion of data relating to the registration of the user at the home processor to the selected partner processor, wherein the data processing transaction is processed by the selected partner processor based on the transmitted data.

9. The method of claim 8, wherein the information relating to the data processing transaction comprises one or more of a type of the data processing transaction and a value related to the data processing transaction.

10. The method of claim 9, wherein the data relating to the registration of the user comprises one or more of an identity of the user, an identity of the home processor, an identity of the user device and at least a portion of a user credit associated with the registration of the user at the home processor.

11. The method of claim 8, wherein the query received from the user device comprises a geo-location of the user device located within the foreign region.

12. The method of claim 8, further comprising:
- receiving a request from the user device for pre-authorizing the data processing transaction at the selected partner processor, wherein the request for pre-authorizing comprises information relating to one or more of a type of the data processing transaction and a value related to the data processing transaction;
- determining whether the registration of the user at the home processor is associated with a user credit that is higher than the value related to the data processing transaction; and
- when the user credit is higher than the value related to the data processing transaction, transmitting an indication to one or more of the user device and the selected partner processor that the pre-authorization is approved.

13. The method of claim 8, wherein:
- the request to authenticate comprises a unique personal identifier of the user; and
- the identity of the user is verified based on the unique personal identifier.

14. The method of claim 13, wherein the unique personal identifier comprises biometric data related to the user, a voice pattern related to the user, an identifier of the user device and a personal identifier number (PIN) assigned to the user.

15. A non-transitory computer-readable medium storing instructions that when executed by a processor, causes the processor to:
- receive a query from a user device of a user requesting information relating to one or more partner processors located within a foreign region outside a home region of the user, wherein the user is registered with a home processor located within the home region of the user;
- search a list of partner processors for the one or more partner processors located within the foreign region, wherein each of the one or more partner processors has a predetermined association with the home processor, wherein the predetermined association comprises a pre-authorized secure connection that can be established between the home processor and each of the one or more partner processors;
- transmit to the user device the information relating to one or more partner processors determined as a result of the search;
- receive a request to authenticate a data processing transaction at a selected partner processor selected from the one or more partner processors;
- verify an identity of the user based on the request;
- transmit to one or more of the user device and the selected partner processor an indication of successful authentication of the data processing transaction;
- receive information relating to the data processing transaction; and
- transmit, based on the information relating to the data processing transaction, at least a portion of data relating to the registration of the user at the home processor to the selected partner processor, wherein the data processing transaction is processed by the selected partner processor based on the transmitted data.

16. The non-transitory computer-readable medium of claim 15, wherein the information relating to the data processing transaction comprises one or more of a type of the data processing transaction and a value related to the data processing transaction.

17. The non-transitory computer-readable medium of claim 16, wherein the data relating to the registration of the user comprises one or more of an identity of the user, an identity of the home processor, an identity of the user device and at least a portion of a user credit associated with the registration of the user at the home processor.

18. The non-transitory computer-readable medium of claim 15, wherein the query received from the user device comprises a geo-location of the user device located within the foreign region.

19. The non-transitory computer-readable medium of claim 15, wherein the instructions further cause the processor to:

receive a request from the user device for pre-authorizing the data processing transaction at the selected partner processor, wherein the request for pre-authorizing comprises information relating to one or more of a type of the data processing transaction and a value related to the data processing transaction;

determine whether the registration of the user at the home processor is associated with a user credit that is higher than the value related to the data processing transaction; and when the user credit is higher than the value related to the data processing transaction, transmit an indication to one or more of the user device and the selected partner processor that the pre-authorization is approved.

20. The non-transitory computer-readable medium of claim 15, wherein:

the request to authenticate comprises a unique personal identifier of the user; and the identity of the user is verified based on the unique personal identifier of the user.

* * * * *